Dec. 6, 1966  S. F. LETO ET AL  3,289,495

DYNAMIC TORQUE RESPONSE DEVICE

Filed April 1, 1964

INVENTORS
SALVATORE F. LETO
JOSEPH LETO
BY Kenway, Jenney & Hildreth
ATTORNEYS

United States Patent Office 3,289,495
Patented Dec. 6, 1966

3,289,495
DYNAMIC TORQUE RESPONSE DEVICE
Salvatore F. Leto, 75 College Ave., Arlington, Mass., and Joseph Leto, 175 Sherburne Road, Lexington, Mass.
Filed Apr. 1, 1964, Ser. No. 356,509
5 Claims. (Cl. 74—674)

This invention relates to an improved dynamic torque-responsive device, and provides an entirely mechanical system in which the torque transmitted by a shaft may be utilized to cause a stationary element to be displaced proportionally to the torque, whether the shaft be rotating or stationary.

The present invention has as its primary object the provision of an improved mechanical system which is simple and reliable, and which provides accurate torque measurement. Further objects and advantages of the invention will become apparent as the following description proceeds.

In general, the torque-responsive device of this invention makes use of a planetary gear set in which a sun gear floats and serves by its angular displacement as a torque indicator. The set includes a coaxial internal ring gear drivingly connected with an output shaft, and a planet gear which is carried by a spider and is mutually engaged between the sun and internal gears. The spider is drivingly connected with the input shaft and supported for rotation about the major axis of the set.

It is essential in this device, in order that the sun gear be displaced only in proportion to the applied torque, and remain unaffected by conjoint rotation of the shafts, that a ratio of one:two be established between the linear speeds of the spider and the internal gear, and that these elements be driven in the same angular direction. The derivation of this necessary relationship will be explained hereinafter. The requirement is met by providing drive trains for drivingly connecting the internal gear and the spider with the shafts, such as to establish an angular speed ratio between the spider and the internal gear which is equal to half the ratio of the pitch radius of the internal gear to the effective radius of the spider.

The input and output shafts are resiliently coupled, as by a torsion bar or spring, so that they may be angularly displaced relative to one another proportional to the torque between them. A torque within the system will cause the shafts to undergo a relative displacement; this is translated through the planetary gear set to the floating sun gear, which is shifted in one angular direction or the other in an amount proportional to the torque. The floating sun gear may be connected to an indicator by which the magnitude of the torque may be measured, or it may be utilized to operate some control mechanism responsive to the torque, for instance, to shift gears in an automatic transmission.

Preferred embodiments of the invention will now be described with reference to the accompanying drawings, in which.

Figure 1:
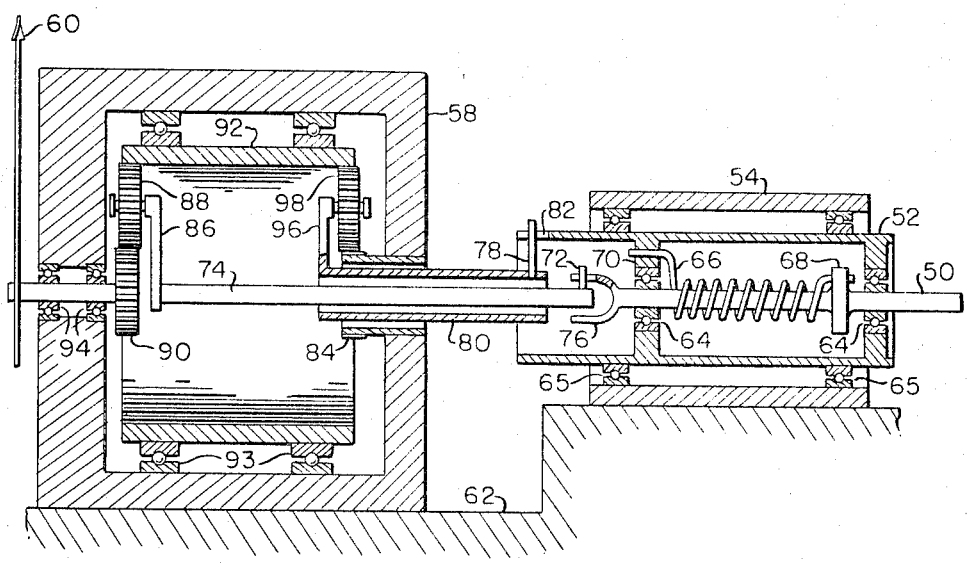
FIG. 1 is a sectional view in elevation of a first embodiment of the invention.

Referring to the embodiment of FIG. 1, a power input shaft 50 and an annular output shaft 52 are arranged concentrically to permit driving connections to be made to both at the same end of the unit. The input and output shafts are journalled in a bearing housing 54, which is conveniently separable from a gear box 58 containing the planetary gear set and an indicator element 60. The gear box 58 and bearing housing 54 are shown mounted in spaced relation on a suitable base 62.

The input shaft 50 is journalled within the output shaft by suitable bearings 64, while the output shaft is journalled in the housing 54 by bearings 65. The two shafts are resiliently coupled by means of a torsion bar or spring 66, which extends helically about the shaft 50 and has its opposite ends secured in a radial flange 68 and an internal circumferentially-extending flange 70 formed in the input and output shafts, respectively. Driving connections with the gear set are made through detachable universal couplings; these include a drive pin 72 secured in an input extension shaft 74 and received in a longitudinally-slotted cup 76 formed at one end of the input shaft, and a similar drive pin 78 secured in an end of an output extension shaft 80 and engaged in a longitudinal slot 82 formed in the output shaft 52. The annular extension shaft 80 concentrically receives the extension shaft 74 therethrough, and the shaft 80 is in turn received through a wall of the gear box 58 within an annular fixed idler gear 84 secured in the gear box.

The shaft 74 has a radially-extending spider 86 rotatably mounting a planet gear 88 thereon, which is mutually engaged with a floating sun gear 90 and a coaxial internal ring gear 92, to form a planetary differential gear set. The internal gear 92 is journalled within the gear box by bearing units 93. The sun gear 90 has secured thereon a suitable indicator 60, and is journalled through a wall of the gear box 58 by means of suitable bearings 94.

Figure 3:
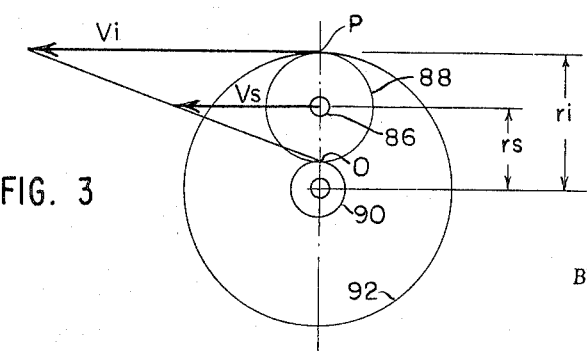
FIG. 3 is a diagram representing the geometrical relationships of a planetary set from which a drive train ratio is derived.

In order to drive the internal gear 92 in the same angular direction as the spider 86, with a selected ratio of drive train values, the output extension shaft 80 is provided with a spider 96 rotatably mounted a planet gear 98. The gear 98 is mutually engaged with a fixed sun gear 84 and the internal gear, thus forming a second planetary set sharing the internal gear with the first set. Rotation of the input shaft 50 and the output shaft 52 results in rotation of the spiders 86 and 96 and gears 88 and 98, with the latter providing a positive drive for the internal gear 92. As a necessary condition, the speed ratio between the drive trains connecting the input and output shafts with the spider 86 and the internal gear 92, respectively, must be such that the floating sun gear 90 remains stationary when there is no relative angular displacement between the shafts, i.e., when there is no torque applied between the input and output shafts. A geometrical derivation of the required ratio is diagrammatically illustrated in FIG. 3, with reference to a layout of the planetary elements 86, 88, 90 and 92.

The necessary condition is met when the linear velocity at the pitch circle of the sun gear 90 is zero. Correspondingly, the linear velocity at the pitch circle of the planet gear 88 must be zero at the point of engagement O with the sun gear, while it must be equal to the linear velocity $Vi$ of the internal gear 92 at the point P of mutual engagement. Consequently, the linear velocities of points on the differential gear 88 across its diameter must conform to a velocity triangle as shown. The linear velocity of the spider 86 at its effective radius $rs$ (at the axis of the planet gear 88) is designated $Vc$, and since this point is located at the diametral center of the gear, the linear velocity of the spider $Vs$ must equal half the linear velocity $Vi$ of the internal gear.

These linear velocities may be represented by the products of the respective radii of rotation and the respective speed ratios or values of the drive trains of the spider and the internal gear, since the angular velocities of the input and output shafts are equal when no torque is applied to the system. Therefore, the ratio of the drive train value of the spider with respect to that of the internal gear, must be equal to half the ratio of the pitch radius of the internal gear $ri$ with respect to the effective radius of the spider $rs$.

In the embodiment of FIG. 1, this cirterion is satisfied in that there is equality in the diameters of the sun gears 84 and 90, the diameters of the planet gears 88 and 98, and the effective radii of their driving spiders 86 and 96. However, this relation is only exemplary of trains which meet the requirement, and represents a special case. The internal gear and the spider may be driven by any drive trains whose overall values are selected with respect to the relative dimensions of these elements according to the foregoing formula.

Figure 2:
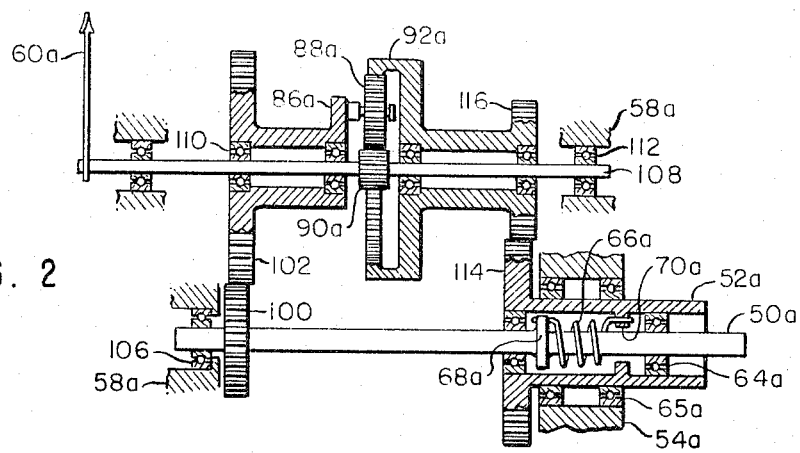
FIG. 2 is a sectional view in elevation of another embodiment of the invention.

Another embodiment is shown in FIG. 2, in which parts corresponding to those of the foregoing embodiment are similarly numbered, with sub-scripts $a$. The input shaft 50$a$ is extended to drive an intermediate gear train including a spur gear 100 and a driven gear 102, the latter being formed as a unit with the spider 86$a$. The shaft 50$a$ is supported rotatably in the housing 58$a$ by means of a bearing 106, while the spider 86$a$ and the internal gear 92$a$ are supported on a jack shaft 108 by means of a series of bearing 110. The jack shaft is in turn rotatably supported in portions of the housing 58$a$ by means of bearings 112. At an end of the jacket shaft, a torque indicator 60$a$ is affixed, while the floating sun gear 90$a$ is keyed or otherwise drivingly engaged with this shaft.

The the output shaft 52$a$ is drivingly connected with the internal gear 92$a$ by means of a gear 114, formed in an end of the output shaft and engaged with a gear 116, which is formed as a unit with the internal gear 92$a$. It will be apparent that the operation of this device is essentially the same as that of the device of FIG. 1. In this instance the diameters of the gear sets 100, 102 and 114, 116 are unequal, being selected with respect to the relative diameters of the elements of the planetary set so as to conform to the foregoing formula.

It may be noted that inasmuch as the effective radius of the spider must always be greater than half the value of the pitch radius of the internal gear in order physically to accommodate a floating sun gear on the major axis of the set, the ratio between the value of the train driving the spider and the value of the train driving the internal gear must necessarily be less than unity. With this limitation, however, the train values will depend only upon the gear sizes selected for the planetary set.

It will be apparent from the foregoing description that when no torque is applied between the input and output shafts, the sun gear 90 or 90$a$ will remain stationary. However, if the input and output shafts are relatively angularly displaced against the basis of the torsion spring 66 or 66$a$, the sun gear 90 or 90$a$ will be angularly displaced in proportion to the torque applied. The degree of displacement is independent of rotation of the shafts, being controlled only by their relative angular displacements. It should be noted with respect to the use of the device that all friction losses arising in the indicator and in the supporting bearings are included as portions of the applied and indicated load.

Although this invention has been described with reference to preferred embodiments, it will be appreciated that various changes and modifications may occur to those skilled in the art without departing from the true spirit and scope of this invention.

Having thus disclosed our invention and described in detail preferred embodiments thereof, we claim and desire to secure by Letters Patent:

1. A torque-responsive device comprising, in combination:
   an input shaft and an output shaft resiliently coupled to said input shaft whereby said shafts may be angularly displaced relatively to each other proportional to the torque between them;
   a planetary gear set including a freely rotatable sun gear rotatably mounted on a major axis of the set, a coaxial internal gear, and a planet gear engaged with said sun gear and with said internal gear, together with a spider rotatably supported on the axis of said planetary set and supporting said planet gear for rotation about its own axis at an effective radius from said major axis,
   and drive means drivingly connecting said shafts each with one of said spider and said internal gear to drive said spider and said internal gear in the same angular direction, said drive means establishing a linear velocity ratio of said spider with respect to said internal gear of one-half, whereby said sun gear is caused to be angularly displaced only in proportion to the relative displacement of said shafts.

2. A torque-responsive device as recited in claim 1, in which said drive means connecting one of said shafts with said internal gear comprises a second planetary gear set coaxial with the first set and including a further spider affixed to said one shaft for rotation about said major axis, a fixed sun gear centered on said major axis, and a further planet gear rotatably supported on said spider for rotation about its own axis at an effective radius from said major axis, said further planet gear being engaged with said fixed sun gear and said internal gear.

3. A torque-responsive device as recited in claim 1, in which one of said input and output shafts is of annular form and receives the other coaxially therein, both of said shafts extending in one axial direction from said planetary gear train for external driving connection.

4. A torque-responsive device comprising, in combination:
   an input shaft and an output shaft resiliently coupled to said input shaft whereby said shafts may be angularly displaced relatively to each other proportional to the torque between them;
   a planetary gear set including a freely rotatable sun gear rotatably mounted on a major axis of the set, a coaxial internal gear, and a planet gear engaged with said sun gear and with said internal gear, together with a spider rotatably supported on the axis of said planetary set and supporting said planet gear for rotation about its own axis at an effective radius from said major axis,
   and drive means drivingly connecting said shafts each with one of said spider and said internal gear to drive said spider and said internal gear in the same angular direction, said drive means establishing a drive train ratio of said spider with respect to said internal gear which is half the ratio of the pitch radius of said internal gear with respect to said effective radius of said spider, whereby said sun gear is caused to be angularly displaced only in proportion to the relative displacement of said shafts.

5. A torque-responsive device comprising, in combination:
   an input shaft and an output shaft resiliently coupled to said input shaft whereby said shafts may be angularly displaced relatively to each other proportional to the torque between them;
   a planetary gear set including a freely rotatable sun gear rotatably mounted on a major axis of the set, a coaxial internal gear, and a planet gear mutually engaged with said sun gear and with said internal gear, together with a spider rotatably supported on the axis of said planetary set and rotatably supporting said planet gear for rotation about its own axis at an effective radius from said major axis, and two gear trains positively drivingly connecting said input and output shafts each with one of said internal gear and said spider to drive said internal gear and said spider in the same angular direction, the ratio of the value of the train driving said spider to the value of the train driving said internal gear being half the ratio of the pitch radius of said internal gear to said effective radius of said spider, whereby said sun gear is caused to be displaced only in proportion to the relative displacement of said shafts.

References Cited by the Examiner

UNITED STATES PATENTS

| | | | |
|---|---|---|---|
| 1,431,401 | 10/1922 | Hupp | 64—27 |
| 1,723,231 | 8/1929 | Ellsworth | 74—675 |
| 1,839,354 | 1/1932 | Spath | 73—136 |
| 2,228,032 | 1/1941 | MacGregor | 73—136 |

FOREIGN PATENTS 729,993  12/1942  Germany.

DAVID J. WILLIAMOWSKY, *Primary Examiner.*

J. R. BENEFIEL, *Assistant Examiner.*